United States Patent [19]

Williams et al.

[11] Patent Number: 4,902,044
[45] Date of Patent: Feb. 20, 1990

[54] WELL APPARATUS

[75] Inventors: Gregory D. Williams, The Woodland; Larry E. Reimert, Spring, both of Tex.

[73] Assignee: Drill-Quip, Inc., Houston, Tex.

[21] Appl. No.: 347,760

[22] Filed: May 4, 1989

[51] Int. Cl.$^4$ .................... E21B 43/013; F16L 21/08; F16L 37/08
[52] U.S. Cl. .................... 285/18; 166/340; 166/344; 285/86; 285/315; 285/419; 285/920
[58] Field of Search .............. 285/18, 86, 315, 321, 285/398, 419, 309, DIG. 920; 166/338, 340, 344, 368

[56] References Cited

U.S. PATENT DOCUMENTS

| | | | |
|---|---|---|---|
| 3,675,713 | 7/1972 | Watkins | 285/18 |
| 4,114,928 | 9/1978 | Lochte | 285/18 |
| 4,169,507 | 10/1979 | Szymczak | 285/18 |
| 4,433,859 | 2/1984 | Driver et al. | 285/315 X |
| 4,491,346 | 1/1985 | Walker | 285/18 |
| 4,496,172 | 1/1985 | Walker | 285/18 |
| 4,516,795 | 5/1985 | Baugh | 285/315 |
| 4,526,406 | 7/1985 | Nelson | 285/18 |
| 4,557,508 | 12/1985 | Walker | 285/315 X |
| 4,708,376 | 11/1987 | Jennings et al. | 285/18 X |
| 4,730,853 | 3/1988 | Gjessing | 285/315 X |

FOREIGN PATENT DOCUMENTS 2102522 2/1983 United Kingdom .
2104170 3/1983 United Kingdom .

OTHER PUBLICATIONS

Composite Catalog of Oilfield Equipment and Services, 1980–81, pp. 1469, 7206.
Composite Catalog of Oilfield Equipment and Services, 1986–87, vol. 3, p. 4573.

Primary Examiner—Stephen J. Novosad
Attorney, Agent, or Firm—Vaden, Eickenroht, Thompson & Boulware

[57] ABSTRACT

There is disclosed a subsea wellhead connector comprised of a lower tubular member mounted on the upper end of a lower wellhead member, and an upper tubular member suspended from an upper wellhead member for lowering into end-to-end connection with the lower tubular member. Locking teeth are formed about the ends of the tubular members, and circumferentially spaced locking segments are carried by the upper tubular member for movement radially into or out of locking engagement with the grooves about the upper and lower tubular members. The locking segments are moved inwardly to locking position by means of a cam ring which surrounds them, and are withdrawn from locking position by spreader dogs carried by the cam ring and extending between the ends of adjacent locking segments.

8 Claims, 5 Drawing Sheets

FIG. 6A
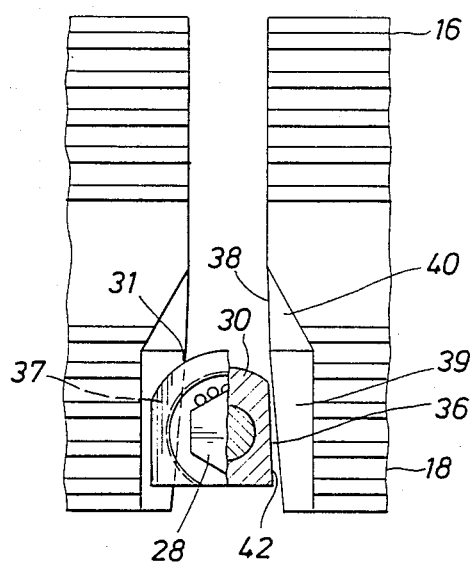
FIG. 6B
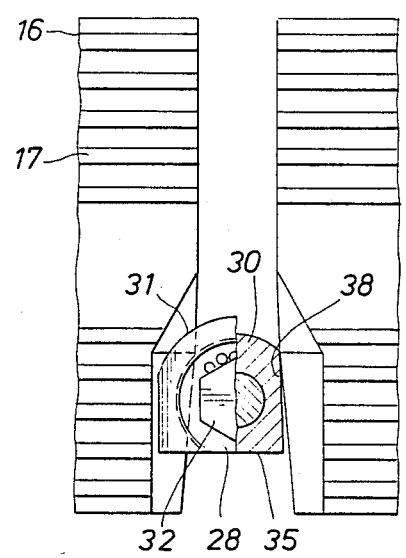
FIG. 6C
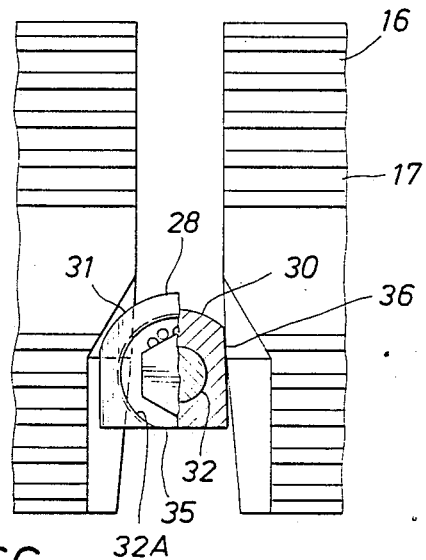
FIG. 6D
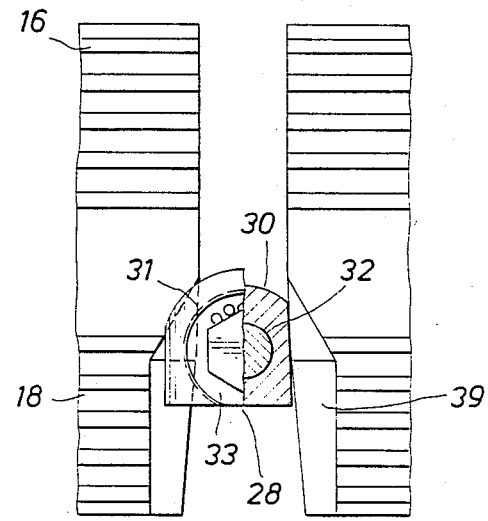
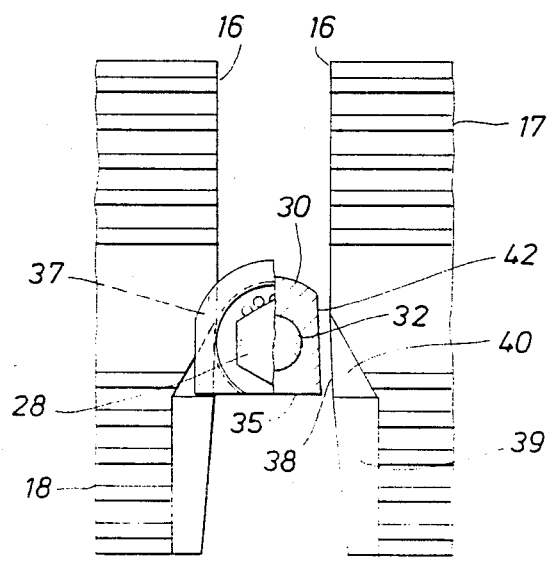
FIG. 6E

WELL APPARATUS

This invention relates generally to well apparatus. In one of its aspects, it relates to improvements in subsea wellhead connectors. In another of its aspects, it relates to improvements in well apparatus having fluid operated, reciprocating type actuators for moving parts thereof, such as locking parts of a subsea wellhead connector, between alternate positions, such as locking and unlocking positions in the case of such a connector.

In the drilling and/or producing of an offshore well, it's necessary to connect and disconnect various wellhead members a substantial distance beneath the water surface. For example, as the well is drilled, the lower end of a blowout preventer stack must be connected to and then disconnected from the upper end of a wellhead member attached to a well casing at the ocean floor, and the lower end of a riser must subsequently be connected to the upper end of the stack. In completing the well, the lower end of a subsea Christmas Tree must be connected to the upper end of the subsea wellhead member. In these and other cases, the connector must be capable of being preloaded in order to contain fluid pressure under conditions of high structural loading.

In one type of subsea wellhead connector, collet fingers are carried about the lower end of the upper wellhead member for pivoting between a first position in which shoulders on their lower ends are free to move past a flange on the upper end of the lower wellhead member, as the upper wellhead member is lowered into end-to-end relation with the lower wellhead member, and a second position in which the shoulders on the lower ends of the collet fingers move beneath a shoulder on the lower side of the flange of the lower wellhead member. More particularly, the shoulders on the flange of the lower wellhead members and on the collet fingers are tapered so that movement of the shoulders of the collet fingers slidably over shoulders on the flanges urges oppositely facing sealing surfaces on the ends of the wellhead members into tight engagement with one another in order to preload the connection.

The collet fingers are moved into their second, locking positions by means of a cam ring having a cam surface which slides downwardly over follower surfaces about the collet fingers. More particularly, the cam ring is so moved by the retraction of extendible and retractable actuators arranged about the cam ring and a flange on the lower end of the a skirt which is carried by the upper wellhead member to surround the actuators. When the wellhead members are to be disconnected, the actuators are extended in order to lift the cam ring to permit the shoulder on the collet fingers to move out from engagement with the shoulder on the flange of the lower wellhead member. More particularly, the cam ring continues to move upwardly to engage an outwardly extending shoulder about the upper ends of the collet fingers so as to positively swing their lower ends outwardly to disconnecting position.

In another type of wellhead connector, dogs having multiple locking teeth are mounted on a lower flange of a skirt about the upper wellhead member for radial movement into and out of locking engagement with multiple locking grooves about the upper end of the lower wellhead member. More particularly, the locking dogs are moved into locking position by means of a cam ring having a cam surface thereabout slidable over follower surfaces about the dogs. Still further, fluid-operated, extendible and retractable actuators are connected to the cam ring and a flange about the lower end of a skirt surrounding the cam ring and the actuators, so that, upon retraction of the actuators, the cam ring is lowered to force the locking dogs into locking engagement with lower wellhead members, and, upon extension, the cam ring is raised to permit the locking dogs to be moved out of locking engagement. The locking teeth and grooves are tapered so as to be slidable over one another in order to move the ends of the wellhead members into tight engagement and thus preload the connection.

U.S. Pat. No. 4,496,172, assigned to the assignee of the present application, discloses still another wellhead connector of this general type which is an improvement over those above described for reasons expressed therein. More particularly, this latter connector comprises a first tubular member adapted to be mounted on the upper end of a first subsea wellhead member and a second tubular member adapted to be suspended from the lower end of a second wellhead member so that it may be lowered therewith into end-to-end relation with the first tubular member, the first tubular member having first locking grooves thereabout and the second tubular member having second locking grooves thereabout. The connector further includes a "C" shaped lock ring having first and second locking teeth which are carried by the upper member for radial movement together between expanded positions in which the second teeth may be moved past the upper end of the lower member for disposal opposite and spaced from the second grooves, when such members are moved into end-to-end relation, and contracted positions in which the first and second teeth are in locking engagement with the first and second grooves, respectively. The teeth have tapered surfaces thereon which are slidable over tapered surfaces of the grooves to urge the ends on the tubular members into tight engagement with one another as the split locking ring moves to contracted position, and a cam ring is arranged about the lock ring for movement between a first position in which the lock ring is expanded and a second position in which the cam ring is slidable over follower means on the lock ring to wedge it into contracted position.

More particularly, extendible and retractable actuators are arranged about the cam ring, and means are provided for connecting the opposite ends of the actuators to the upper tubular member and the cam ring for moving the cam ring between its upper and lower positions.

In one embodiment of the above described connector, the lock ring assumes its expanded position when unstressed, and, when so expanded, supports the cam ring in its first position, and the cam ring is slidable over the follower means on the lock ring to move it to contracted position as the cam ring moves from its first to its second position. More particularly, a dog mounted on the cam ring extends into the split between the ends of the lock ring in order to spread them apart, as the cam ring moves into its first position, and thus force the teeth out of the grooves in the event they have a tendency to stick to the locking grooves. In another embodiment of the connector, the lock ring assumes its contracted position when unstressed, and the cam ring expands the lock ring and holds it expanded as the cam ring moves to its first position.

The lower portions of the ends of the split lock ring are tapered upwardly and inwardly, and the upper portions of the dog are correspondingly tapered for sliding thereover so as to wedge the ends of the lock ring apart as the cam ring is raised during retraction of the lock ring. More particularly, the dog is so located on the cam ring that its tapered surfaces do not engage those on the ends of the locking ring until the cam ring has moved upwardly and away from the follower means about the lock ring, so that the lock ring is free to move radially outwardly, and thus withdraw its teeth from the grooves about the lower wellhead member, as the ends of the lock ring are first spread apart.

If the tapered surfaces on the ends of the lock ring form a steep angle in order to maximize the vertical component for spreading the ends, the height of the cam ring and overall connector is necessarily large. On the other hand, if the angle is shallow, the horizontal component of the wedging force may not be large enough to spread the ends of the ring. An object of this invention is to provide a connector of the type shown in the aforementioned U.S. Pat. No. 4,496,172 wherein this compromise need not be made and wherein instead the connector is of such construction that it may be of minimum height and yet capable of providing the force necessary to spread the ends of the lock ring.

It was also found that, in the aforementioned connector, the portions of the tubular members intermediate their ends and the first grooves in which teeth on the lock ring engaged were unduly stressed, and, in any case, stressed considerably more than other portions intermediate adjacent grooves as the tapered surfaces of the locking teeth slide over those of the grooves in order to preload the connector. It is therefore another object of the invention is to provide a connector in which these portions of the tubular members are stressed to substantially the same extent as the others.

It may be found that the actuators are unable to lift the cam ring, and thus release the locking means, of a connector of this type. For example, the actuators may not provide sufficient lifting force to free locking parts which have become stuck, for whatever reason. Also, the actuators themselves may fail due, for example, to leakage between their pistons and cylinders. It has therefore been proposed to provide these actuators with secondary release systems in which a secondary piston is arranged to move the primary piston of the actuator in the event of either or both of the above noted circumstances.

In one such connector, the actuator includes a primary piston sealably reciprocable within the upper tubular member to form a first pressure chamber above it, and a secondary piston sealably slidable within upper tubular member beneath the primary piston to form a second pressure chamber beneath the pistons and a third chamber beneath the secondary piston. More particularly, means are provided for selectively supplying hydraulic fluid to and venting hydraulic fluid from the first and second chambers, so as to reciprocate the main piston and thus the cam ring, during normal operations, as well as means for supplying it to the third chamber when there is need for releasing the locking parts, or venting it therefrom to return the system to normal operation. However, in order to minimize the height of the actuator, and thus the overall connector, the secondary piston is relatively short, and as a result, may tend to cock and thus bind within the second tubular member. Also, its pressure responsive area is limited to that of the primary piston and it is slidable over seal surfaces of the upper tubular member over which the primary piston slides, and thus over areas which are subjected to wear and/or damage during normal operation.

A still further object of this invention is to provide a connector of this type, or other well apparatus having parts movable between alternate positions, with a secondary release system of no greater height or length than that above described, but in which its secondary piston is longer, and thus not as susceptible to cocking, and further in which its secondary piston has a releasing pressure responsive area greater than that of the primary piston and is slidable over seal surfaces other than those over which the primary piston is slidable.

These and other objects are accomplished, in accordance with the illustrated embodiment of the present invention, by a subsea wellhead connector of the type disclosed in the aforementioned U.S. Pat. No. 4,496,172, but wherein the locking means comprises a plurality of circumferentially spaced apart locking segments, with the first and second teeth formed on each of the locking segments for contraction into and expansion out of locking engagement with first and second grooves about the upper and lower tubular members, and a cam ring is arranged about the locking segments for axial movement with respect to them between a first position in which the locking segments may move to expanded positions and a second position in which the cam ring is slidable over the locking segments to wedge them into contracted position. More particularly, a means including dogs carried by the cam ring for extension inwardly therefrom between the ends of adjacent locking segments having surfaces thereon slidable over surfaces on the ends of the segments for spreading the segments apart and thereby withdrawing the teeth on the segments from the grooves, as the cam ring is moved from its second to its first position. Thus, the spreading necessary to release the teeth of the segments from the grooves is distributed over the several segments such that the spreading surfaces on the ends of the locking segments may be inclined at a relatively steep angle with respect to the horizontal in order to provide the necessary spreading force without increasing the height of the locking means and thus the overall connector.

Preferably, the surfaces on the dogs are so arranged as to initially spread the segments apart at a relatively slow rate, and thus with a relatively high horizontal component of force, as the teeth are initially disengaged from the grooves and the tendency for them to stick is greatest, and then at a relatively rapid rate, and thus with a relatively low component of force, when they are unstuck, so that the cam ring continues to move toward its first position and the locking segments are moved radially outwardly at a more accelerated rate. For this purpose, the dogs and ends of the locking segments include first surfaces which are initially slidable over one another at a relatively small angle with respect to the vertical, and second surfaces which are subsequently slidable over one another at a relatively large angle with respect to one another. More specifically, in their illustrated embodiments, each dog comprises a pin which extends radially from the cam ring and has the first surfaces formed on its opposite sides for engaging upwardly tapered first surfaces on the ends of the locking segments, and an enlarged head on the pin having second, generally conically shaped surfaces thereon for engaging similarly tapered second surfaces on the ends of the segments above the upwardly tapered surfaces thereon.

In accordance with another novel aspect of the present invention, each of the first and second tubular members has an additional groove thereabout intermediate its end and the adjacent groove in which a tooth is disposable so that the portion of the member intermediate said groove and end is free to flex, as are the portions thereof intermediate adjacent teeth, and thus not overstressed but instead stressed to substantially the same extent as the other portions intermediate adjacent teeth.

In accordance with a still further novel aspect of the present invention, the subsea wellhead connector is provided with a secondary release system which includes a secondary piston whose outer circumferential surface is sealably slidable within an inner circumferential surface of the upper tubular member below the primary piston and which has an annular leg sealably slidable between an inner circumferential surface of the primary piston and an oppositely facing surface of the second tubular member to form a second chamber beneath it and a third chamber between its upper end and the primary piston, the secondary piston having a first end surface within the second chamber, and the primary and secondary pistons having second end surfaces thereon which are arranged within the third chamber. More particularly, means are provided to selectively supply pressure fluid to said third chamber, while being exhausted from said first and second chambers, in order to move said cam ring in said opposite direction, or to selectively supply pressure fluid to said second chamber, while being exhausted from said first and third chamber, in order to move said secondary piston and thus the ring in said opposite direction in the event the ring is not so moved by fluid pressure supplied to the third chamber.

Since the height of the leg of the secondary piston is not limited to the space within the upper tubular member beneath the primary piston, it may be of sufficient height to prevent the secondary piston from cocking without increasing the overall height of the connector. Furthermore, the first pressure responsive surface on the secondary piston has a larger pressure responsive surface than the second surface of the primary piston so that it is capable of raising the cam ring with greater force than the primary piston with the same source of fluid pressure. More particularly, the secondary piston has a pressure responsive surface which is sealably slidable over a surface in the second chamber beneath that over which the primary surface on the primary piston is slidable, so that it as well as the sealing surfaces on the telescoping leg of the secondary system are slidable over new surfaces not subject to wear due to the primary piston.

In the drawings, wherein like reference characters are used throughout to designate like parts:

FIG. 1 is a vertical sectional view of a portion of a subsea wellhead connector constructed in accordance with the present invention, including the upper tubular member and locking segments carried thereby as they are lowered onto the lower tubular member for connection therewith, and with the cam ring raised to withdraw the locking segments to their expanded positions so that they are able to move downwardly about the grooves about the lower tubular member;

Figure 1:
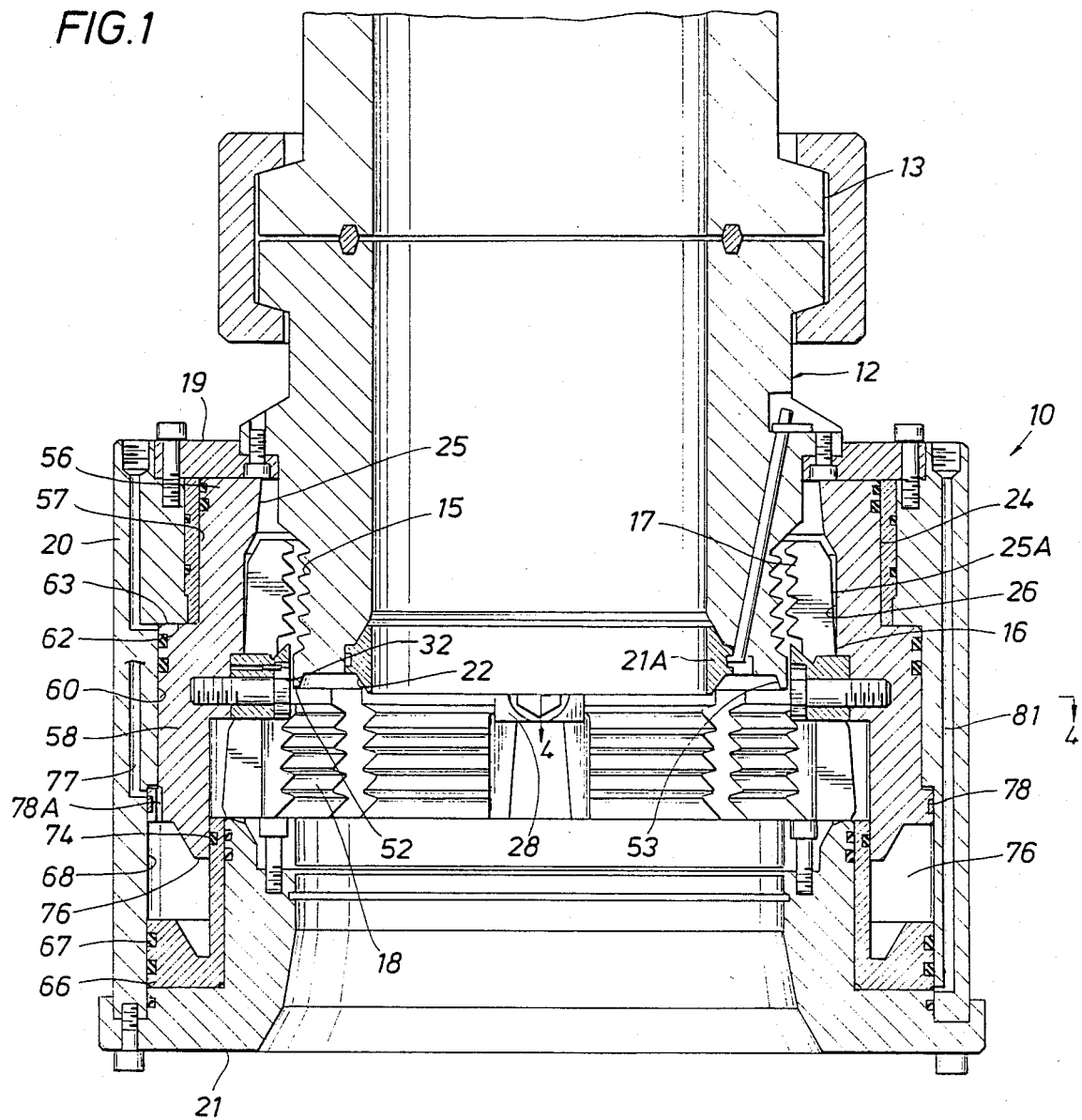
Figure 2A:
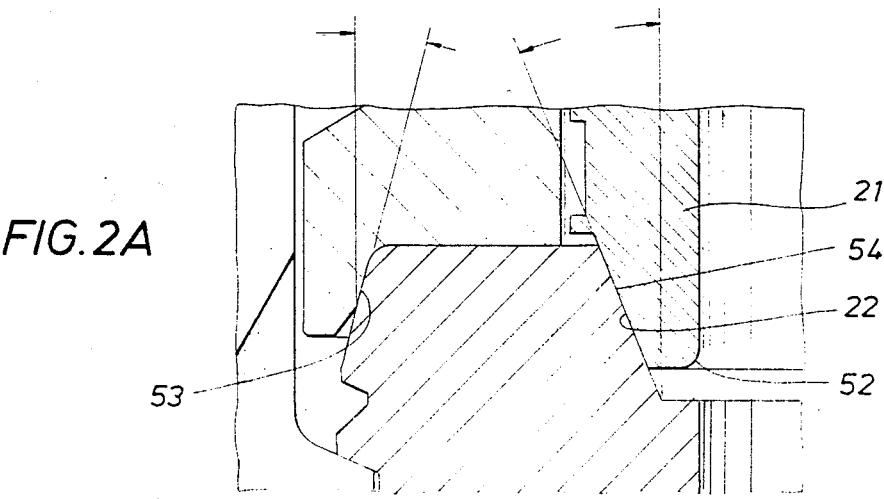
FIG. 2A is an enlarged detailed view of the circled portion of FIG. 2 indicated by "2A"
Figure 2:
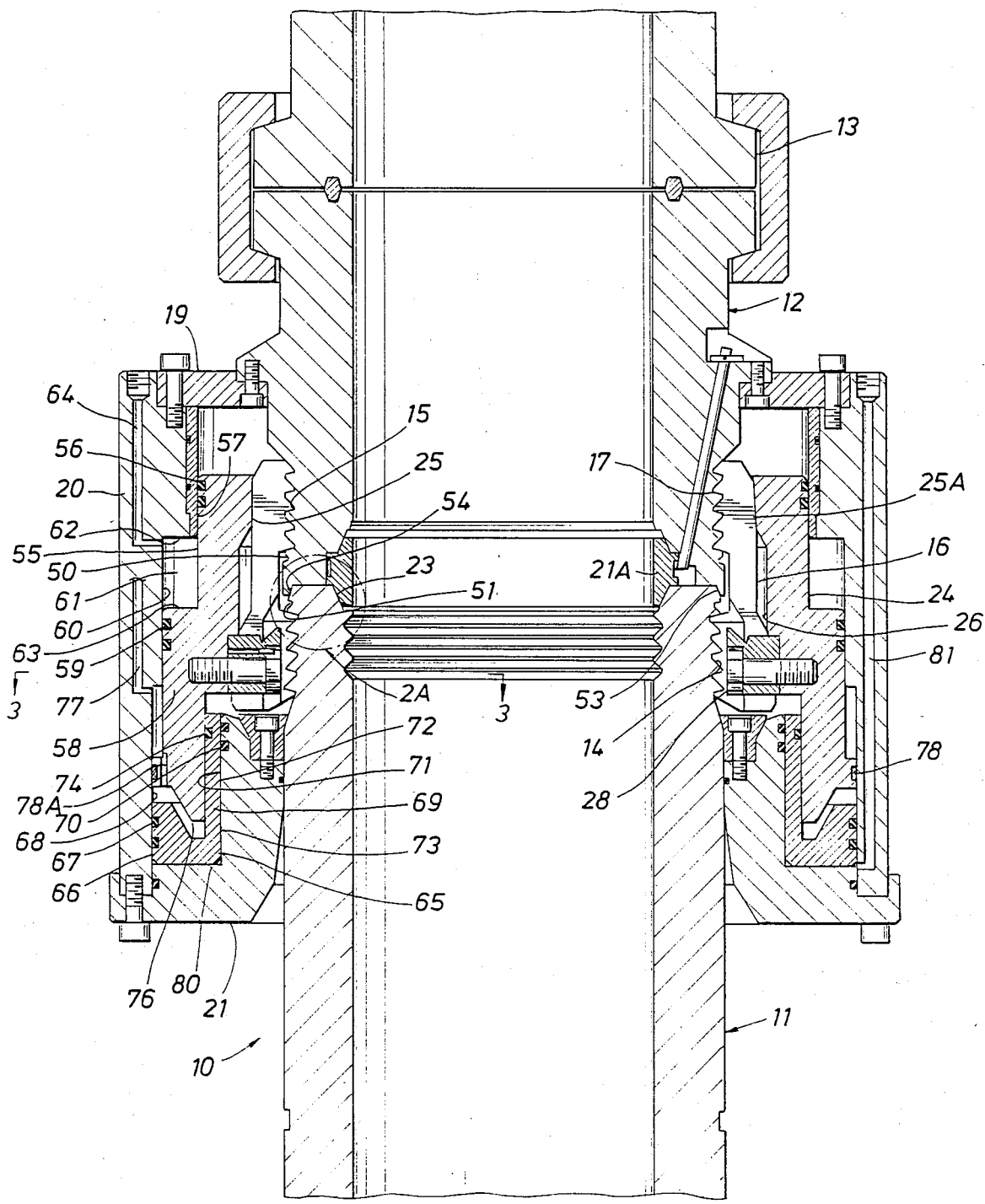
FIG. 2 is a view similar to FIG. 1, but upon landing of the upper tubular member upon the lower member and lowering of the cam ring to contract the locking segments into locking engagement with the teeth about both members and preload the connection between them.
Figure 3:
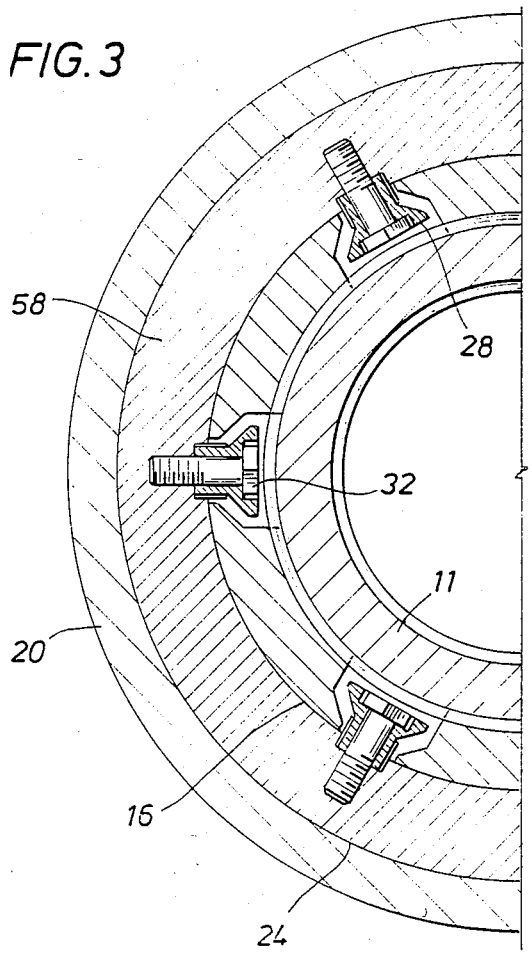
Figure 4:
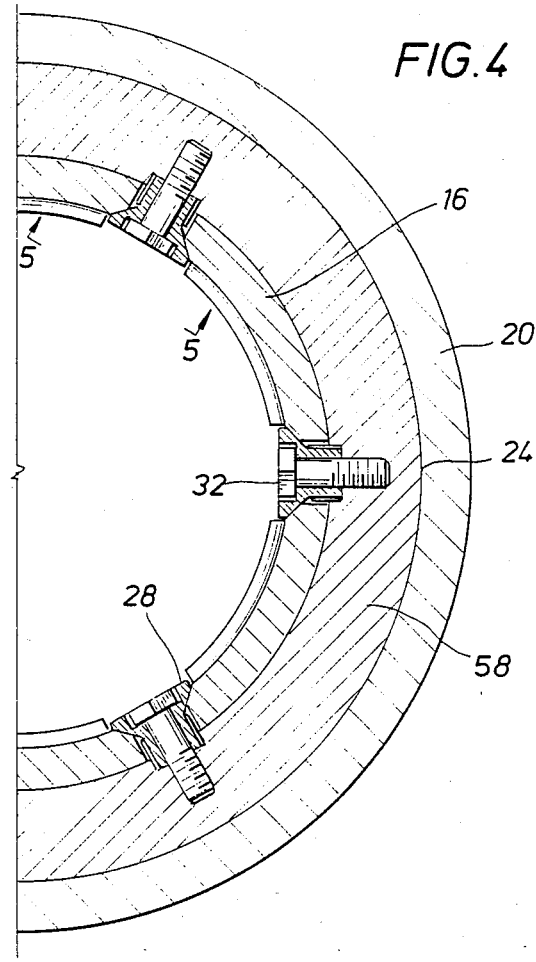
Figure 5:
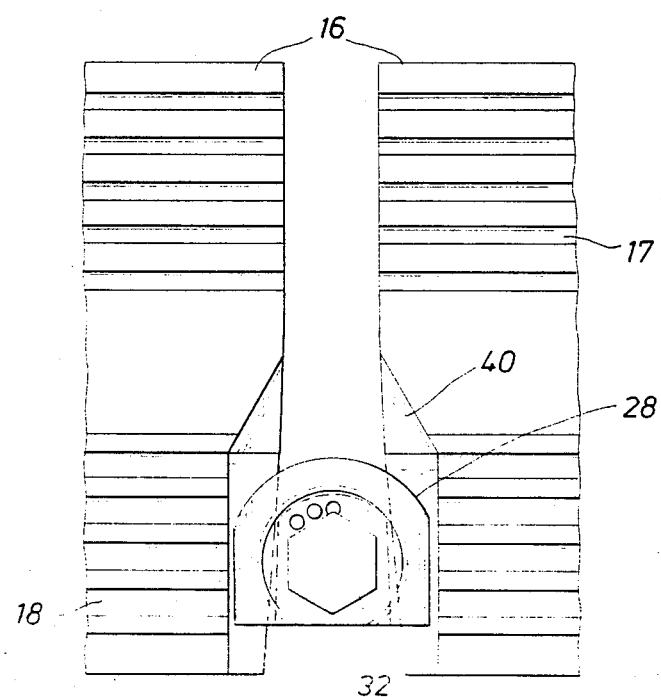
Figure 7:
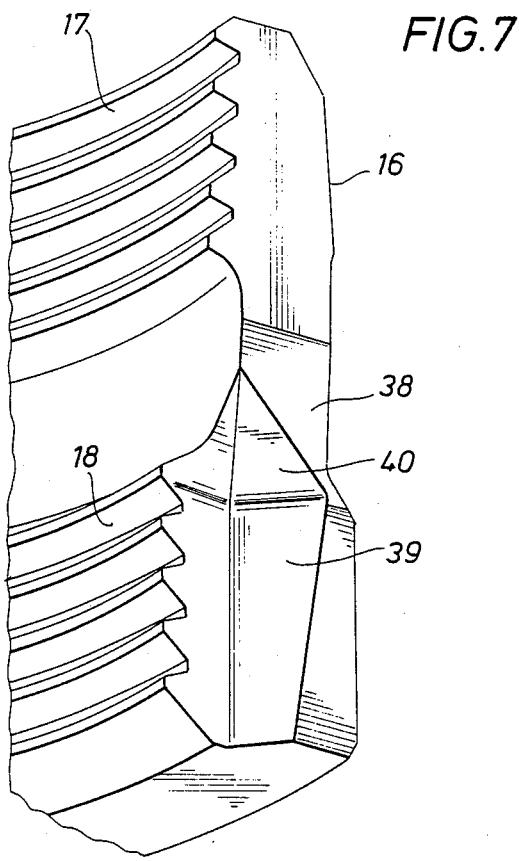
Figure 8:
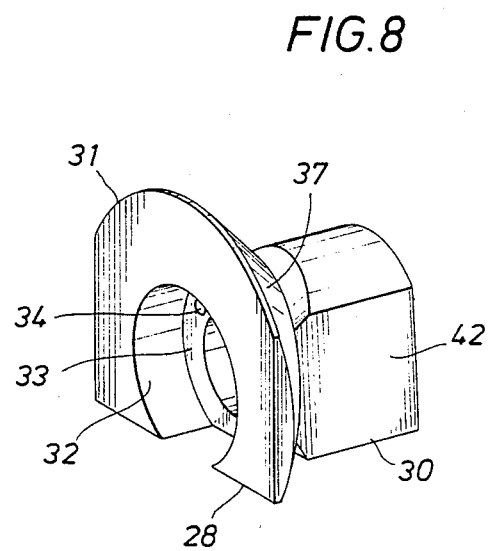
Figure 9:
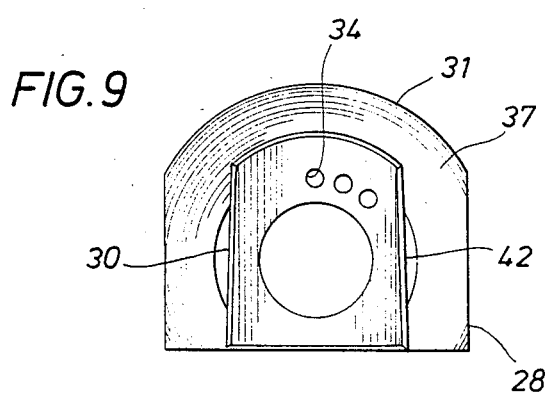
Figure 10:
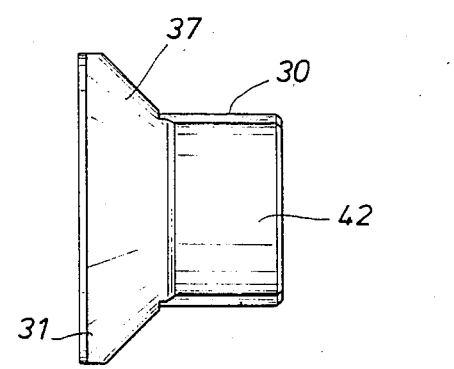
Figure 11:
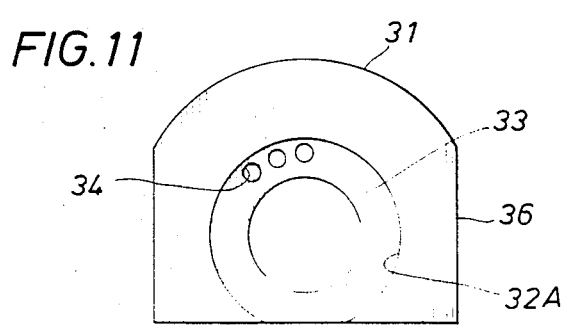

FIGS. 3 and 4 are horizontal sectional views of the connector, as seen along broken lines 3—3 and 4—4 of FIGS. 1 and 2, respectively;

FIG. 5 is an enlarged view of the inner side of the connector and showing the spreader dogs in the lower position they occupy relative to the ends of adjacent locking segments when the connector is in the locked position of FIGS. 1 and 3;

FIGS. 6A, 6B, 6C, 6D and 6E are smaller scale views of the inner side of the connector similar to FIG. 5, but showing the spreader dogs and the ends of the adjacent locking segments upon raising of the spreader dogs to spread and withdraw the locking segments from the locked position of FIG. 2 to the unlocked positions of FIG. 1;

FIG. 7 is a further enlarged, perspective view of the end of one of the locking dogs, showing the surfaces thereon which are engaged by the spreader dogs as the spreader dogs are raised to unlock the connector;

FIG. 8 is a perspective view of a spreader dog, as seen from the inner end and one side thereof;

FIG. 9 is a view of the outer end of the spreader dog;

FIG. 10 is a top view of the spreader dog;

FIG. 11 is a view of the inner end of the spreader dog; and

Figure 12:
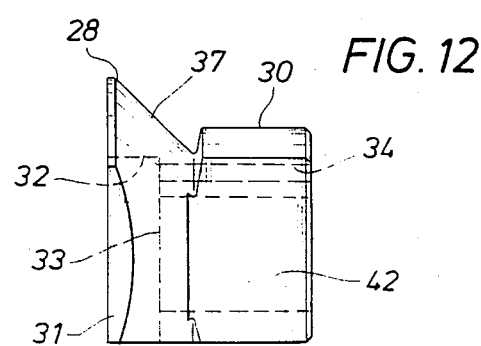

FIG. 12 is a side view of the spreader dog.

With reference now to the details of the above described drawings, the overall connector, which is indicated in its entirety by reference character 10, is shown to comprise a lower tubular member 11 adapted to be mounted on the upper end of a lower wellhead member, and an upper tubular member 12 adapted to be suspended from the lower end of an upper wellhead member 13 for end-to-end connection to the lower wellhead member. The lower tubular member may be connected to or form an integral part of a wellhead housing in which casing hangers (not shown) may be mounted for suspending casing within a well bore. The upper tubular member is shown to be clamped to the lower end of the upper wellhead member, which may be a blowout preventer stack during drilling of the well, or the lower end of a subsea Christmas tree during the completion and production stage of the well. In either event, the upper tubular member is adapted to be guidably lowered with it onto the lower member.

As previously described, each of the tubular members is provided with locking grooves thereabout having profiles to receive locking teeth on the inner sides of circumferentially spaced apart locking segments (to be described) carried by the upper tubular member 12. More particularly, locking grooves 14 are formed about the upper end of the lower tubular member, and locking grooves 15 are formed about the lower end of the upper tubular member. Although the grooves are shown to be of the same profile, they may be of different profile, and, in fact, the number of grooves on each tubular member need not be the same.

As also previously described, the upper tubular member is adapted to be locked to the lower tubular member by means of locking segments 16 which are carried by the upper tubular member in circumferentially spaced relation and which have upper and lower locking teeth 17 and 18, respectively, about their inner sides adapted to be moved between the expanded position of FIG. 1 wherein the teeth are retracted to permit the upper member to be raised from or lowered into end-to-end engagement with the lower member, and the contracted locking positions of FIG. 2 wherein the upper teeth 17 are in locking engagement with grooves 15 and the lower teeth 18 are in locking engagement with locking grooves 14 to hold the members in locked position. Thus, a skirt 20 is suspended from a flange 19 of the upper tubular member for disposal about and extension downwardly from the upper tubular member, and an "L" shaped flange 21 extends inwardly from the lower end of the upper skirt to support the lower ends of the locking segments on its upper end for radial movement between their contracted and expanded positions.

As shown, the locking teeth of the locking segments and the grooves in the tubular members have tapered surfaces which are slidable over one another, as the locking segments move to contracted positions, so as to pull the lower end of the upper tubular member downwardly into tight engagement with the upper end of the lower tubular member, and thus preload the connector. More particularly, a flexible lip on the lower end of a seal ring 21A carried by the lower end of the upper tubular member has an outer surface 22 tapered downwardly inner and inwardly for sliding along a similarly tapered surface 23 about the upper end of the bore through the lower tubular member, as the upper tubular member is lowered onto the lower tubular member, so as to form a seal therewith.

The locking segments are adapted to be moved from their expanded to their contracted positions by means of a cam ring 24 having cam surfaces 25 and 26 on its inner side disposed about and slidable over follower surfaces 25A and 26A about the locking segments, and from their contracted to their expanded positions by means of spreader dogs 28 extending inwardly from the cam ring between the ends of adjacent locking segments. More particularly, upon downward movement of the cam ring from the upper position of FIG. 1 to the lower position of FIG. 2, its cam surfaces force the locking segments inwardly to locking positions, and conversely, upon raising of the cam ring from the position of FIG. 2 to the position of FIG. 1, the spreader dogs spread and retract the locking segments, as they move upwardly with the cam ring, to a position in which the lower teeth of the locking segments are withdrawn from the grooves in the tubular members, whereby the upper tubular member may be moved into or out of locking position with respect to the lower tubular member.

As shown, each spreader dog 28 comprises a pin 30 which is connected to and extends radially inwardly from the inner side of the cam ring near its lower follower surface, and which has a head 31 on the inner end of the pin. The dog is mounted on the cam ring by a bolt 32 which extends through the head and pin for threaded connection to the cam ring. When the bolt is fully made up with the cam ring, its enlarged outer end is received in a recessed portion 32A of the head and bears on an end surface 33 of the recess to hold the head against the inner end of the pin and the outer end of the pin against the inner side of the locking segments. Rods extend into holes 34 in the end of the pin to prevent the bolt from backing off.

As shown, the head 31 comprises a partial disk having its lower end 35 and sides 36 cut off for purposes which will be apparent from the description to follow, and the remaining upper periphery of the inner side of the head is contoured to provide it with a conically shaped outwardly facing surface 37. Surfaces on the pin and head are arranged to engage surfaces formed on the ends of the adjacent locking segments, which, as best shown in FIG. 7, include radially disposed surfaces 38 which extend upwardly from the lower ends of the locking segments at a relatively small angle with respect to the vertical, and surfaces 39 which extend inwardly from the surfaces 38 at an angle with respect to a radial plane so as to provide recessed portions in which the outwardly extending flat sides of the head may move as the pin is raised upwardly with the cam ring between the ends of the segments. More particularly, there is a beveled surface 40 at the upper end of such surface 39 which extends outwardly from its lower to its upper end to form a generally conically shaped upper end of the recess positioned for engagement by the conical upper surface 37 of the head as the head moves upwardly with the pin. More particularly, the sides 42 of the bolt are flattened and extend at a small angle with respect to the vertical so as to initially engage the tapered surfaces 38 on the ends of the locking segments, as the cam ring is lifted, and thus spread adjacent segments apart as the ring continues to rise.

The surfaces of these sides of the pin thus provides an initial spreading force having a large horizontal component which is effective in initially breaking the tight contact between the teeth and locking grooves. When this tight engagement has been broken, the conical surface 37 on the head move into engagement with the skewed surfaces 40 on the ends of the locking segments so as to continue to spread the segments apart and retract them, but at a greater rate due to the larger angle of engagement between them. This occurs, of course, as the pin moves upwardly between the sides of the locking segments above the tapered surfaces. Just prior to this more rapid withdrawal of the locking segments, the cam ring is moved upwardly to a position in which the cam surfaces thereon are raised above the follower surfaces on the locking segments, thereby permitting the locking segments to be withdrawn at the rapid rate.

In accordance with another novel aspect of the present invention, and as best shown in the enlarged view of FIG. 2A, a groove 50 is formed about the upper tubular member between its lower end and the adjacent groove in which an upper tooth 17 on the locking segments is adapted to be received, and a groove 51 is formed about the lower tubular member intermediate its upper end and the adjacent groove in which a lower tooth 18 on the locking segments is adapted to be received. As previously described, these grooves enable the portions of the tubular members between them and the adjacent grooves to flex as the teeth 17 and 18 of the locking segments move into the adjacent grooves, and thus are useful in preventing such portions of the members between their ends and the grooves in which teeth are engagable from being over stressed, and more particularly to preferably equalize loading on all of such portions between as the teeth are moved slidably over the surfaces of the locking grooves during preloading of the connection.

The lower end of the upper tubular member is provided with a lip 52 about its outer diameter having an inner surface 53 which is tapered downwardly and outwardly for sliding along a similarly tapered surface 54 about the upper end of the lower tubular member as the upper tubular member is lowered into end-to-end engagement with the lower tubular member. More particularly, these guide surfaces extend at lesser angles with respect to the vertical than the angles at which the downwardly and inwardly tapered seal surfaces 22 and 23 on the lower end of the seal ring 21 and about the bore of the lower tubular member extend. Hence, the guide surface of the lip 52 will engage the guide surface 54 about the upper end of the lower tubular member before the seal surface 22 on the seal ring engages the corresponding surface 23 about the upper end of the bore about the lower tubular member. This then prevents damage to the seal surfaces in the event the tubular members are not axially aligned as they first move downwardly into end-to-end engagement. That is, the guide surface on the lip will guide the seal surface on the ring into such alignment before it slidably engages the seal surface about the upper end of the bore of the lower tubular member.

The cam ring is moved between its upper and lower positions a primary piston formed thereon and sealably reciprocable within the upper tubular member in which the cam ring reciprocates. In the event the upwardly directed force on the primary piston is not sufficient to disengage the teeth of the locking segments from the grooves of the tubular members, the cam ring is adapted to be moved upwardly by a secondary piston which is also sealably slidable within the upper tubular member, and, as will be described, further sealably slidable with respect to the primary piston. More particularly, the upper end of the cam ring has a reduced outer diameter portion 55 which carries seal rings 56 for sealably sliding within the reduced inner diameter 57 of the skirt 20 of the upper tubular member, and an enlarged outer diameter portion 58 which also carries seal rings 59 for sealably sliding within an enlarged inner diameter 60 of the skirt beneath the reduced diameter thereof.

A passageway 64 is forced in the skirt so as to supply hydraulic fluid to or vent hydraulic fluid from the pressure chamber 61 formed between the reduced outer diameter portion of the cam ring and the enlarged inner diameter portion of the upper tubular member, as well as between a downwardly facing surface 62 of the skirt at the intersection of its reduced and enlarged inner diameter portions and a pressure responsive surface 63 on the primary piston having a pressure responsive area defined between the seal rings 56 and 59. The force due to hydraulic fluid supplied to this chamber will of course urge the cam ring downwardly, and thus in a direction to move the locking segments to locking position.

A secondary piston 65 of the secondary release system is disposed beneath the cam ring and the primary piston thereon and includes an outer surface 66 carrying seal rings 67 sealably slidable within a further enlarged inner diameter 68 of the skirt of the upper tubular member beneath the enlarged inner diameter 60 thereof over which the seal rings 59 are slidable, and an inner surface 69 which is sealably slidable over seal rings 70 carried within the outer surface 71 of the upstanding wall of the lower flange 21 of the upper tubular member on which the locking segments are supported. More particularly, this inner surface 69 of the secondary piston is formed on an annular wall or leg 72 which extends upwardly between the inner wall 70 of the tubular member and the inner surface 73 of the lower end of the cam ring and carries a seal ring 74 about its outer surface which is sealably engagable with the inner surface 73 of the lower end of the cam ring. Thus, the cam ring and the primary piston formed thereon are free to reciprocate vertically with respect to the secondary piston during normal operation of the hydraulic system to alternately connect and disconnect the connector.

The lower end of the cam ring and the upper end of the secondary piston form another pressure chamber 76 between them to which hydraulic fluid may be supplied or from which it may be vented through another passageway 77 formed in the skirt of the upper tubular member. This pressure chamber is thus formed between a downwardly facing pressure responsive surface of the primary piston on the cam ring intermediate the seal rings 59 and 74, and an upwardly facing pressure responsive surface on the auxiliary piston intermediate the seal rings 67 and 74, as well as between the outer surface of the upwardly extending wall 72 of the secondary piston and the inner side of the skirt intermediate the seal rings 59 on the outer side of the cam ring and the seal rings 74 on the outer side of the secondary piston. The outer surface of the lower end of the cam ring is enlarged and carries a wear ring 78 for sliding over the inner surface 68 of the skirt during reciprocation of the cam ring, and a port 78A formed through the lower end of the cam ring connects with the pressure chamber 76 above and below the wear ring.

A lower pressure chamber is formed between the lower end 80 of the secondary piston and the upper side of the lower flange of the tubular member as well as between the inner diameter 78 of the skirt and the outer side of the inner wall of the lower flange of the upper tubular member below the seal rings 70. Hydraulic fluid may be supplied to or exhausted from the chamber 80 through a further passageway 81 formed in the skirt.

During normal operation, hydraulic fluid may be supplied to the intermediate chamber while being vented from the upper chamber 61 in order to move the cam ring in an upward direction and thereby release the locking segments from locking position. However, in the event the locking teeth of the locking segments are stuck within the locking grooves of the tubular members, and the primary release system is unable to supply sufficient force to release them, pressure fluid may be supplied to the lower pressure chamber 80 through passageway 81, while being vented from the upper and intermediate pressure chambers through the passageways connecting therewith. This provides an additional force proportional to the pressure responsive area on the lower side of the secondary piston which is larger than that of the primary piston. During normal operations, of course, hydraulic fluid is exhausted from the lower side of the secondary piston so that pressure hydraulic fluid in the intermediate chamber will normally urge it to its lower position shown in the drawings wherein its lower end rests upon the lower flange of the upper tubular member.

As previously mentioned, the above described secondary release system has several advantages over the prior systems of this type. For one thing, its upwardly extending inner wall 72 provides a large vertical guide surface which stabilizes its reciprocation and thus prevents it from cocking or binding in the cylinder in which it reciprocates. Additionally, the seal rings 74 and 67 on the inner side of its upwardly extending wall and its outer diameter are slidable over surfaces in the cylinder over which the primary piston is slidable during normal operation of the system. Still further, the downwardly facing pressure responsive area of the release system is not limited to that of the downwardly facing pressure responsive area of the main piston means and in fact is substantially larger, thereby enabling even greater force to be applied under emergency conditions.

Reviewing the overall operation of the wellhead connector, and assuming its upper portion shown in FIG. 1 is to be lowered onto the lower tubular member on the upper end of the wellhead member, the cam ring of the upper portion is raised to lift the spreader dogs and thus retract the locking segments. This permits the lower teeth 18 on the locking segments to move freely downwardly over the grooves about the upper end of the lower tubular member. As the lower end of the upper tubular member approaches the upper end of the lower tubular member, the guide surfaces 53 about the lower end of the upper tubular member slidably engage the guide surfaces 54 about the upper end of the lower tubular member so as to axially align them as the seal surfaces 22 about the seal ring 21 move slidably over the seal surface 23 about the upper end of the bore of the lower tubular member.

Upon landing of the lower end of the upper tubular member on the upper end of the lower tubular member, the cam ring is moved downwardly by the introduction of pressure fluid into the chamber 61, and the exhaust of pressure fluid from the intermediate and lower pressure chambers. This lowers the spreader dogs and moves the cam surfaces on the inner side of the cam ring downwardly along the follower surfaces on the outer sides of the locking rings so as to force the locking rings inwardly to the locking position of FIG. 2. As the tapered surfaces on the locking teeth slide over the tapered surfaces on the locking dogs, the end surfaces of the tubular members are forced tightly against one another to preload the connection.

When the wellhead connector is to be disconnected, to permit the upper wellhead member to be raised from the lower wellhead member, the cam ring is moved upwardly by the introduction of pressure fluid to the intermediate pressure chamber while exhausting pressure fluid from the upper chamber 61. If the upward force due to this primary release system is not sufficient to withdraw the locking teeth from the locking grooves, pressure fluid is introduced into the lower chamber through the passageway 81 so as to force the secondary piston upwardly against the cam ring in order to raise the cam ring with it and thus release the locking teeth. Whether moved upwardly by the primary piston or the secondary piston, raising of the cam ring will lift the spreader dogs with it so as to withdraw the locking segments from the locking grooves. As previously described, the surfaces on the spreader dogs are so arranged with respect to the surfaces on the ends of the locking segments as to initially withdraw the segments with a large force, but at a slow rate, and then at a relatively rapid rate following initial withdrawal of the lock segments from the locking grooves. As the locking segments are withdrawn, the cam ring is moved upwardly to a position in which the locking segments are free to move radially outwardly at a relatively rapid rate, following which they are lifted with the lower flange of the upper tubular member to the position in FIG. 1. At this time then, the upper portion of the connector is disconnected from the lower tubular member to permit it to be raised with the upper wellhead member.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A subsea wellhead connector, comprising
   a first tubular member adapted to be mounted on the upper end of a first subsea wellhead member,
   a second tubular member adapted to be suspended from the lower end of a second subsea wellhead member for lowering therewith into end-to-end relation with the first tubular member,
   said first tubular member having a first set of locking grooves thereabout and said second tubular member having a second set of locking grooves thereabout,
   circumferentially spaced apart locking segments each having first and second sets of locking teeth which are carried by the second tubular member for radial movement between expanded positions in which the first set of teeth may be moved past the end of the first tubular member for disposal opposite and spaced from the first grooves, when said second member is lowered into end-to-end relation with the first member, and contracted positions in which the first and second sets of teeth are in locking engagement with the first and second sets of grooves, respectively,
   at least one set of said teeth having tapered surfaces thereon which are slidable over tapered surfaces of the corresponding set of grooves to urge the ends of said members into tight engagement with one another as the locking segments move to contracted position,
   a cam ring arranged about the locking segments for axial movement between a first position in which the cam ring permits the locking segments to move to expanded positions and a second position in which the cam ring is slidable over the locking segments to wedge them into contracted position,
   means including dogs carried by the cam ring for extension radially inwardly between the ends of adjacent locking segments and having surfaces thereon slidable over surfaces on the ends of the segments in order to spread said segments apart and thereby withdraw the teeth on the segments from the grooves, as the cam ring is moved from its second to its first position, and
   means for moving said cam ring between said positions.

2. A connector of the character defined in claim 1, wherein
   the surfaces on the dogs and ends of the segments are arranged to initially spread the segments apart at a relatively slow rate, and thus with a relatively high horizontal component of force, and then at a relatively rapid rate and thus with a relatively low horizontal component force as the cam ring continues to move toward its first position.

3. A connector of the character defined in claim 2, wherein
the surfaces on the dogs and the ends of the locking segments include first surfaces which are initially slidable over one another at a relatively small angle with respect to the vertical and second surfaces which are subsequently slidable over one another at a relatively large angle with respect thereto.

4. A connector of the character defined in claim 3, wherein
each dog comprises a pin extending radially from the cam ring and having said first surfaces formed on opposite sides thereof for engaging upwardly tapered first surfaces on the ends of the locking segments, and an enlarged head on the pin having the second generally conical shaped surfaces thereon for engaging similarly tapered second surfaces on the ends of the segments above the upwardly tapered surfaces thereon 5. A subsea wellhead connector, comprising
a first tubular member adapted to be mounted on the upper end of a first subsea wellhead member,
a second tubular member adapted to be suspended from the lower end of a second subsea wellhead member for lowering therewith into end-to-end relation with the first tubular member,
said first tubular member having a first locking groove thereabout and said second tubular member having a second locking groove thereabout,
locking means having first and second axially spaced locking teeth carried by the second tubular member for radial movement between expanded positions in which the first tooth may be moved past the end of the first tubular member for disposal opposite and spaced from the first groove, when said second member is lowered into end-to-end relation with the first member, and contracted positions in which the first and second teeth are in locking engagement with the first and second grooves, respectively,
said teeth having tapered surfaces thereon which are slidable over tapered surfaces of the grooves to urge the ends of said members into tight engagement with one another as the locking means moves to contracted position,
a cam ring arranged about the locking means for axial movement between a first position in which the locking means is expanded and a second position in which the cam ring is slidable over the locking means to wedge said locking means into contracted position, and
means for moving said cam ring between said positions,
each of said first and second tubular members having an additional groove thereabout intermediate its end and the groove thereabout to receive a tooth so that the portion of the member intermediate said grooves is free to flex.

6. A subsea wellhead connector, comprising
a first tubular member adapted to be mounted on the upper end of a first subsea wellhead member,
a second tubular member adapted to be suspended from the lower end of a second subsea wellhead member for lowering therewith into end-to-end relation with the first tubular member,
locking means including locking parts having downwardly and inwardly tapered surfaces carried by the second tubular member for movement between an expanded position in which they may be moved past the upper end of the first tubular member and a contracted position in which they are slidable over locking parts having correspondingly tapered surfaces on the first tubular member so as to urge the ends of said members into tight engagement with one another as the locking means moves to contracted position,
a cam ring arranged about the locking means for axial movement between a first position in which the locking means is expanded and a second position in which the cam ring is slidable over the locking means to wedge said locking means into contracted position, and
means for moving said cam ring between said positions,
said first tubular member having a groove thereabout intermediate its end and the tapered surfaces thereon so that the portion of the member intermediate said tapered surfaces and groove is free to flex.

7. A subsea wellhead connector, comprising
a first tubular member adapted to be mounted on the upper end of a first subsea wellhead member,
a second tubular member adapted to be suspended from the lower end of a second subsea wellhead member so that it may be lowered therewith into end-to-end relation with the first tubular member,
locking means including locking parts carried by the second tubular member for movement between an expanded position in which they may be moved past the upper end of the first tubular member and a contracted position in which they are slidable over locking parts on the first tubular member so as to urge the ends of said members into tight engagement with one another,
a cam ring carried by the second tubular member in surrounding relation to the locking means for moving the locking means inwardly upon movement of the cam ring in one axial direction and for moving the locking means outwardly upon movement of the cam ring in the opposite axial direction,
said cam ring having a primary piston thereon whose outer circumferential surface is sealably slidable within the inner circumferential surface of the second tubular member to form a first pressure chamber and which has a first surface thereon arranged within the first chamber to urge the primary piston and thus the cam ring in said one direction in response to the supply of pressure fluid to said first chamber,
a secondary piston whose outer circumferential surface is sealably slidable within the second tubular member below the primary piston and which has an annular leg sealably slidable between an inner circumferential surface of the primary piston and an oppositely facing circumferential surface of the second tubular member to form a second pressure chamber beneath it and a third chamber beneath its upper end and the primary piston, ( said secondary piston having a first end surface thereon arranged within the second chamber,
said primary and secondary pistons having second surfaces on their ends arranged within the third chamber,
means by which pressure fluid may be selectively supplied to said first chamber while being exhausted from said second and third chambers, in order to move said cam ring in said one direction, or selectively supplied to said third chamber while being exhausted from said first and second chambers in order to move said cam ring in said opposite direction, or selectively supplied to said second chamber while being exhausted from said first and third chambers in order to move said secondary piston and thus the ring in said opposite direction in the event the ring is not so moved by fluid pressure supplied to the third chamber.

8. For use with well apparatus having a housing in which a part is adapted to be moved between alternate positions, and an actuator for so moving said part, said actuator comprising a ring reciprocable within the housing and arranged to move the part to one position, upon movement in one direction, and to move the part to its other position, upon movement in the other direction, said ring having a primary piston thereon whose outer circumferential surface is sealably slidable within an inner circumferential surface of the housing to form a first pressure chamber and which has a first end surface thereon arranged within the first chamber, a secondary piston whose outer circumferential surface is sealably slidable within an inner circumferential surface of the housing on one end of the primary piston and which has an annular leg sealably slidable between an inner circumferential surface of the primary piston and an oppositely facing circumferential surface of the housing to form a second pressure chamber on one end thereof and a third chamber between its other end and the primary piston, said secondary piston having a first end surface arranged in the second chamber, and secondary pistons having second end surfaces thereon arranged within the third chamber, and means by which pressure fluid may be selectively supplied to said first chamber while being exhausted from said second and third chambers, in order to urge said cam ring in said one direction, or selectively supplied to said third chamber while being exhausted from said first and second chambers in order to move said cam ring in said opposite direction, or selectively supplied to said second chamber while being exhausted from said first and third chambers in order to move said secondary piston and thus the ring in said opposite direction in the event the ring is not so moved by fluid pressure supplied to the third chamber.

* * * * *